UNITED STATES PATENT OFFICE.

CONRAD SCHRAUBE AND HANS THEODOR BUCHERER, OF LUDWIGSHAFEN, GERMANY, ASSIGNORS TO THE BADISCHE ANILIN & SODA FABRIK, OF LUDWIGSHAFEN, GERMANY, A CORPORATION OF BADEN.

AZO DYE AND PROCESS OF MAKING SAME.

SPECIFICATION forming part of Letters Patent No. 700,565, dated May 20, 1902.

Application filed January 18, 1901. Serial No. 43,771. (No specimens.)

*To all whom it may concern:*

Be it known that we, CONRAD SCHRAUBE and HANS THEODOR BUCHERER, doctors of philosophy and chemists, subjects of the King of Prussia, German Emperor, residing at Ludwigshafen-on-the-Rhine, in the Kingdom of Bavaria, Germany, have invented new and useful Improvements in Azo Dyes and Processes of Making Same, of which the following is a specification.

The hitherto-described mono and dis azo coloring-matters which are obtained by combining diazo compounds with 1.8 naphthalene-diamin-sulfo-acid have not become of commercial importance on account of their instability. They are chemically altered on boiling in a dilute soda solution (containing about one per cent. $Na_2CO_3$) or sulfuric-acid solution (containing about five (5) per cent. $H_2SO_4$) and in some cases merely by dissolving the sodium salt of the dyestuff in hot water.

Our invention has for its object the production of new azo coloring-matters with the aid of a 1.8 naphthalene-diamin-sulfo-acid, which coloring-matters are stable to the action of boiling carbonate-of-soda solution (containing about one (1) per cent. $Na_2CO_3$) or a boiling solution of sulfuric acid, (containing about five (5) per cent. $H_2SO_4$,) and we attain this end either by combining the 1.8 naphthalene-diamin-sulfo-acid first with acetone and then bringing the body thus formed into reaction with a diazo compound or by combining the 1.8-naphthalene-diamin-sulfo-acid in the known manner with a diazo body and then treating the dyestuffs thus obtained under suitable conditions with acetone.

The following examples will serve to illustrate the nature of our invention and the manner of carrying it into practical effect; but the invention is, of course, not confined to the examples. The parts are by weight.

*Example 1—Monoazo dye from 1.8 naphthalene-diamin-4-sulfo-acid, acetone, and diazotized alpha-naphthylamin.*—Dissolve one hundred and nineteen (119) parts of 1.8 naphthalene-diamin-4-sulfo-acid in two thousand five hundred (2,500) parts of water at a temperature of from sixty (60) to seventy (70) degrees centigrade, with the addition of twenty-six (26) parts of calcined sodium carbonate, and add seventy-five (75) parts of hydrochloric acid (containing about thirty (30) per cent. of HCl) to precipitate the naphthalene-diamin-sulfo-acid. At once allow thirty (30) parts of acetone to flow slowly in under the surface of the liquid while stirring. As soon as the reaction is completed cool down to zero centigrade and run in a diazo solution prepared from seventy-one and five-tenths (71½) parts of alpha-naphthylamin. The formation of the coloring-matter begins at once and can be accelerated by the addition of acetate of soda. The dyestuff separates out almost completely as a violet-black precipitate. It dissolves in dilute carbonate-of-soda solution, the solution being violet-red, and it dyes wool nearly the same shade, which is changed to blue by hydrochloric acid.

Instead of proceeding as above the naphthalene-diamin-sulfo-acid may be dissolved in soda, the solution weakly acidified with acetic acid, cooled, and the diazo solution from alpha-naphthylamin slowly added. When combination is complete, the solution is warmed up to from sixty (60°) to seventy (70°) degrees centigrade. Any free hydrochloric acid that may be present is removed by the addition of acetate of soda, and the dyestuff is treated with acetone, as before described. On account of the sparing solubility of the coloring-matter, however, the method first set forth is preferable.

*Example 2—Disazo dye from 1.8.4 naphthalene-diamin-sulfo-acid, a diazo compound, and acetone.*—Suspend one hundred and nineteen (119) parts of 1.8.4 naphthalene-diamin-sulfo-acid in two thousand (2,000) parts of water, add one hundred (100) parts of crystallized sodium acetate and then a paste of 1.4 diazo-naphthalene-sulfo-acid prepared from two hundred and forty-five (245) parts of sodium naphthionate. A violet-colored monoazo dyestuff is at first formed, which on addition of sufficient sodium acetate is converted by more diazo compound into the disazo dyestuff. On combination being completed warm the solution up to a temperature of from sixty (60°) to seventy (70°) degrees centigrade and slowly run in thirty (30) parts of acetone. The coloring-matter being sufficiently soluble, the condensation takes place without difficulty. Salt out the coloring-matter formed. It dyes wool blue-violet shades.

By employing one hundred and ninety-five (195) parts of sodium sulfanilate in place of the sodium naphthionate for the preparation of the diazo compound a disazo coloring-matter is obtained which after condensation with acetone dyes wool violet-red. Furthermore, mixed disazo dyestuffs can be obtained, which may also be readily condensed with acetone—for example, the coloring-matter formed by combining one molecular proportion of diazotized alpha-naphthylamin and one molecular proportion of diazotized sulfanilic acid with one molecular proportion of 1.8.4 naphthalene-diamin-sulfo-acid. After condensation with acetone it dyes wool red-violet.

In the foregoing cases the procedure can be so varied that the naphthalene-diamin-sulfo-acid is first condensed with acetone and afterward coupled with diazo compounds, or the naphthalene-diamin-sulfo-acid is first coupled with a diazo compound to form a monoazo dyestuff, which is afterward treated with acetone and finally combined with a second molecular proportion of a diazo body.

*Example 3—Azo dye from 1.8.3.6 naphthalene-diamin-disulfo-acid, acetone, and diazotized para-nitranilin.*—Dissolve one hundred and seventy (170) parts of 1.8 naphthalene-diamin, .3.6 disulfo-acid-mono-sodium salt in one thousand five hundred (1,500) parts of water at a temperature of from sixty (60°) to seventy (70°) degrees centigrade, and then add slowly thirty (30) parts of acetone. Reaction at once sets in and the acetone has soon almost entirely disappeared. Cool the solution to zero centigrade and run in a diazo solution prepared from sixty-nine (69) parts of para-nitranilin. The formation of the dye proceeds quickly, and in a short time it begins to separate out as a dark-blue precipitate. When combination is complete, it can be collected by filtration or it can be dissolved by the addition of soda and salted out with common salt. It dyes wool violet.

The above operations can be performed in the reverse order, if desired—that is to say, the naphthalene-diamin-disulfo-acid can first be combined with diazotized para-nitranilin, excess of sodium acetate be added, and the resulting coloring-matter, which is soluble in sodium-acetate solution, be afterward treated with acetone at a temperature of about sixty (60°) degrees centigrade.

*Example 4—Disazo dye from 1.8.3.6 naphthalene-diamin-disulfo-acid, acetone, diazotized anilin, and diazotized para-nitranilin.*— Carry out the condensation of the disulfo-acid with acetone, as in Example 3. Cool the solution to zero centigrade and run in a diazo solution prepared from forty-six and five-tenths (46½) parts of anilin. Remove the excess of mineral acid by the addition of sodium acetate, and when the formation of mono-azo coloring-matter is complete add a diazo solution prepared from sixty-nine (69) parts of para-nitranilin, likewise with the addition of acetate. The second combination takes place quickly. Salt the coloring-matter out, press, and dry. It dyes wool violet-blue. The production of dyestuffs from one molecular proportion of 1.8.3.6 naphthalene-diamin-disulfo-acid, one molecular proportion of diazotized alpha-naphthylamin, and one molecular proportion of diazotized para-nitranilin or from one molecular proportion of 1.8.3.6 naphthalene-diamin-disulfo-acid and two molecular proportions of diazotized para-nitranilin is effected in a similar manner. The former of these dyestuffs dyes wool gray-blue, and the latter dyes it blue. In this case also the order of the operations can be varied, as described in Example 2, by first preparing disazo coloring-matters from the naphthalene-diamin-disulfo-acid and diazo compounds and then treating these coloring-matters with acetone or by preparing a mono-azo coloring-matter from the diamin acid and a diazo body, condensing this with acetone and then combining with a further molecular proportion of a diazo compound.

Our new dyestuffs are in the form of their sodium salts soluble in water with a violet-red to blue color and in concentrated sulfuric acid with a blue to green color. The aqueous solutions dye wool violet-red to blue. The addition of hydrochloric acid to the aqueous solutions produces a dark-violet to green precipitate. On boiling with dilute carbonate-of-soda solution (containing one (1) per cent. of $Na_2CO_3$) or with dilute sulfuric acid (containing five (5) per cent. of $H_2SO_4$) for ten (10) minutes they are not decomposed.

The coloring-matter which we more particularly wish to claim and which can be derived from 1.8.3.6 naphthalene-diamin-disulfo-acid, acetone, and two molecular proportions of diazotized para-nitranilin, is in the form of its sodium salt soluble in water with a blue color and in concentrated sulfuric acid with a green color. It dyes wool blue. The addition of hydrochloric acid to its aqueous solution gives rise to a blue precipitate. On boiling with dilute carbonate-of-soda solution (containing one (1) per cent. of $Na_2CO_3$) or with dilute sulfuric acid (containing five (5) per cent. of $H_2SO_4$) for ten (10) minutes it is not decomposed.

So far as making the product herein claimed is concerned, the order in which the combination is effected is immaterial whether the last of the constituents added be the diazo compound or the 1.8 naphthalene-diamin-sulfo-acid or the acetone.

Now what we claim is—

1. The process for the production of new azo coloring-matters by combining together 1.8 naphthalene-diamin-sulfo-acid, acetone and a diazo body.

2. The process for the production of new azo coloring-matters by combining together 1.8.3.6 naphthalene-diamin-disulfo-acid, acetone and a diazo body.

3. The new azo coloring-matters which can be derived from 1.8 naphthalene-diamin-sulfo-acid, acetone and a diazo body, and which in the form of their sodium salts are soluble in water with a violet-red to blue color, and in concentrated sulfuric acid with a blue to green color; which dye wool violet-red to blue, and whose aqueous solutions by the addition of hydrochloric acid produce a dark-violet to green precipitate, and which when boiled with dilute carbonate-of-soda solution, containing about one per cent. of $Na_2CO_3$, or with dilute sulfuric acid, containing about five per cent. of $H_2SO_4$, for ten minutes are not decomposed, substantially as hereinbefore described.

4. The new disazo coloring-matter which can be derived from 1.8.3.6 naphthalene-diamin-disulfo-acid, acetone, and diazotized paranitranilin which in the form of its sodium salt is soluble in water with a blue color, and in concentrated sulfuric acid with a green color; which dyes wool blue, and whose aqueous solution by the addition of hydrochloric acid produces a blue precipitate and which when boiled with dilute carbonate-of-soda solution, containing about one per cent. of $Na_2CO_3$, or with dilute sulfuric acid, containing about five per cent. $H_2SO_4$, for ten minutes is not decomposed, substantially as hereinbefore described.

In testimony whereof we have hereunto set our hands in the presence of two subscribing witnesses.

CONRAD SCHRAUBE.
HANS THEODOR BUCHERER.

Witnesses:
ERNEST F. EHRHARDT,
JACOB ADRIAN.